(12) United States Patent
Liso et al.

(10) Patent No.: US 8,517,634 B1
(45) Date of Patent: Aug. 27, 2013

(54) SYSTEMS AND METHODS FOR REPLACING, REPOSITIONING AND REPAIRING A SECTION OF SUBSEA PIPE LOCATED ON A SEABED

(75) Inventors: Stephen Liso, Houston, TX (US); Eric Harding, League City, TX (US); Thomas O'Donnell, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 271 days.

(21) Appl. No.: 13/076,008

(22) Filed: Mar. 30, 2011

(51) Int. Cl.
*F16L 1/26* (2006.01)

(52) U.S. Cl.
USPC .......................... 405/158; 405/173; 405/184.1

(58) Field of Classification Search
USPC .............. 405/156, 158, 169, 170, 173, 184.1, 405/184.4
See application file for complete search history.

(56) References Cited

U.S. PATENT DOCUMENTS

| | | | |
|---|---|---|---|
| 4,076,130 A | 2/1978 | Sumner | |
| 4,109,480 A | 8/1978 | Sumner | |
| 4,218,158 A * | 8/1980 | Tesson | 405/170 |
| 4,265,566 A * | 5/1981 | Scodino | 405/172 |
| 4,310,264 A * | 1/1982 | Brownlee | 405/172 |
| 4,352,595 A * | 10/1982 | Scodino | 405/158 |
| 6,290,431 B1 | 9/2001 | Exley et al. | |
| 6,422,315 B1 * | 7/2002 | Dean | 166/340 |
| 7,402,000 B2 * | 7/2008 | Bastesen et al. | 405/170 |
| 7,635,239 B2 | 12/2009 | Lawler | |
| 7,891,429 B2 * | 2/2011 | Boyce et al. | 166/340 |
| 2009/0058076 A1 * | 3/2009 | Giles et al. | 285/24 |

* cited by examiner

*Primary Examiner* — John Kreck
(74) *Attorney, Agent, or Firm* — Karen R. DiDomenicis; Melissa Patangia (57) ABSTRACT

Methods and systems are provided for replacing, repositioning and/or repairing a section of pipe within a pipeline located on a seabed. System components are delivered by a surface vessel to the vicinity of the damaged section of pipe. Piles are partially driven into the seabed adjacent the damaged section of pipe such that each of the piles has an exposed pile top above the seabed. Pile tops are employed to support load-bearing manipulator assemblies each having a hydraulically controlled manipulator arm having a a grapple capable of grasping and repositioning a section of pipe. The manipulator assemblies are operated to grasp, lift and manipulate pipe surrounding the damaged section. Other pile tops are employed to support spool supports capable of firmly holding a replacement spool piece of pipe during replacement operations. During replacement of a damaged section of pipe, the manipulator assemblies hold the pipe while cuts are made to free the damaged section. Above the surface, a replacement spool is made and fitted with spool supports and pipe connectors. The replacement spool is lowered and installed with the assistance of a remotely operated vehicle.

14 Claims, 8 Drawing Sheets

SYSTEMS AND METHODS FOR REPLACING, REPOSITIONING AND REPAIRING A SECTION OF SUBSEA PIPE LOCATED ON A SEABED

BACKGROUND

The invention relates to systems and methods for replacing, repositioning and repairing a section of subsea pipe located on a seabed, such as pipe used in an oil and gas transportation pipeline.

Known methods for repairing subsea oil and gas transportation pipelines located on soft and sloping seabed conditions require specialized pipeline repair equipment and procedures, and/or terrain modifications to improve the stability. Currently used methods for pipe repair on slopes of 5 to 10° with respect to the horizontal generally require minor terrain modifications. Pipe repair on slopes of greater than 10° generally require some equipment modifications. For instance, load handling equipment used for such repairs must be stabilized with a stable anchoring system such as a large cumbersome mud mat system, such as, for example, the system disclosed in U.S. Pat. No. 6,290,431. Such systems cannot be stabilized for use in sloping terrain without additional anchoring, making them impractical on sloping or uneven terrain. On steep slopes of greater than 15°, mud mat systems have been found to be unstable.

It would be desirable to have systems and methods to accommodate subsea pipeline repairs on seabed conditions ranging from very soft and powdery soil to moderate clay and on topography ranging from relatively flat to inclines and declines of up to about 30° with respect to the horizontal.

SUMMARY

In a first embodiment, a method is provided for repairing, repositioning and/or replacing a section of pipe or equipment located on a seabed with a replacement spool, the method including the following steps:
  a. partially driving at least two piles into the seabed adjacent a section of pipe or equipment to be repaired, repositioned and/or replaced such that each of the piles has an exposed pile top above the seabed;
  b. installing on each of the pile tops a manipulator assembly having a base for receiving the pile top, a hydraulically controlled manipulator arm including a proximal arm pivotally connected to the base, a distal arm pivotally connected to the proximal arm, a swivel joint connected to the distal arm and a grapple connected to the swivel joint capable of grasping and repositioning the section of pipe or equipment; and
  c. operating the manipulator assemblies to grasp the pipe or equipment and lift the pipe or equipment off the seabed.

In a second embodiment, a method is provided for replacing a section of pipe within a pipeline located on a seabed with a replacement spool, the method including the following steps:
  a. grasping a pipe at locations upstream and downstream of a section of pipe to be replaced and lifting the pipe off the seabed using a plurality of manipulator assemblies each manipulator assembly having a base for receiving the pile top, a hydraulically controlled manipulator arm including a proximal arm pivotally connected to the base, a distal arm pivotally connected to the proximal arm, a swivel joint connected to the distal arm and a grapple connected to the swivel joint capable of grasping and repositioning a section of pipe wherein each manipulator assembly is installed on a pile top adjacent the pipe;
  b. providing two opposing cut ends of pipe and a gap in the pipeline;
  c. providing a replacement spool having two ends and having two spool supports and two connectors for bridging abutting sections of pipe installed thereon between the two ends, wherein each spool support has a base for receiving a spool support pile top, a restraint mounted to the base capable of securely holding the replacement spool and a hydraulically controlled pushoff mechanism integral to the restraint comprising two pistons capable of pushing in an axial direction along the length of the replacement spool and wherein each connector is positioned between a spool support and one end of the replacement spool;
  d. aligning the replacement spool with the cut ends in the gap;
  e. providing two spool support pile tops in the seabed;
  f. lowering the replacement spool so that the spool supports fit onto the spool support pile tops; and
  g. actuating each pushoff mechanism to push each connector to bridge each end of the replacement spool and each cut end of pipe.

In a third embodiment, a spool support apparatus is provided for securely supporting a replacement spool of pipe during a pipe spool replacement operation, the apparatus comprising:
  a. a pile capable of being partially driven into a seabed thereby providing an exposed pile top above the seabed; and
  b. a spool support having a base for receiving a spool support pile top, a restraint mounted to the base capable of securely holding the replacement spool and a hydraulically controlled pushoff mechanism integral to the restraint comprising two pistons capable of pushing in an axial direction along the length of the replacement spool.

In a fourth embodiment, a manipulator apparatus is provided for grasping and repositioning a section of pipe during a pipe spool replacement operation, the apparatus comprising:
  a. a pile capable of being partially driven into a seabed; and
  b. a manipulator assembly having a base for receiving the pile top, a hydraulically controlled manipulator arm including a proximal arm pivotally connected to the base, a distal arm pivotally connected to the proximal arm, a swivel joint connected to the distal arm and a grapple connected to the swivel joint capable of grasping and repositioning a section of pipe.

In a fifth embodiment, a system is provided for replacing a section of pipe located on a seabed with a replacement spool, the system including:
  a. at least six piles capable of being partially driven into a seabed adjacent a section of pipe thereby providing a plurality of exposed pile tops above the seabed;
  b. at least four manipulator assemblies, each manipulator assembly having a base for receiving the pile top, a hydraulically controlled manipulator arm including a proximal arm pivotally connected to the base, a distal arm pivotally connected to the proximal arm, a swivel joint connected to the distal arm and a grapple connected to the swivel joint capable of grasping and repositioning a section of pipe;
  c. at least two spool supports, each spool support having base for receiving a spool support pile top, a restraint mounted to the base capable of securely holding the replacement spool and a hydraulically controlled push-off mechanism integral to the restraint comprising two pistons capable of pushing in an axial direction along the length of the replacement spool; and d. at least two connectors for bridging two abutting sections of pipe, each connector capable of slideably fitting around the replacement spool.

In a sixth embodiment, a control system is provided for directing a sequence of steps in a subsea pipe repair system, the control system including:

a. a computer located on a surface vessel for directing a subsea pipe repair operation;

b. a computer program in a computer readable media capable of transmitting information from the computer to manipulator assemblies located on the seabed;

c. a power line connecting a power source located on the surface vessel and a submerged interface apparatus;

d. a telemetry line connecting the computer and a submerged interface apparatus;

e. a power line connecting the submerged interface apparatus and a manipulator assembly for providing power to the manipulator assembly; and f. a telemetry line connecting the submerged interface apparatus and the manipulator assembly for providing hydraulic control of the manipulator assembly.

DETAILED DESCRIPTION

The methods and systems described herein are useful for repositioning, repairing and/or replacing a section of subsea pipe located on, near or beneath a seabed, for convenience, simply referred to herein as "on a seabed." Such subsea pipe, also referred to interchangeably as "pipe," is employed as part of a greater pipeline for transporting liquid and/or gas. For instance, the pipeline can be used for transporting hydrocarbon products such as oil, water or gas between offshore production facilities or between a platform and a shore facility. Typically, such pipe is made from steel or suitable alloy and has a diameter between about 2 in (5 cm) and about 50 in (127 cm). The methods and systems disclosed herein have particular advantages when the pipe is located on an area of seabed having a slope up to about 30° with respect to the horizontal.

Figure 1:
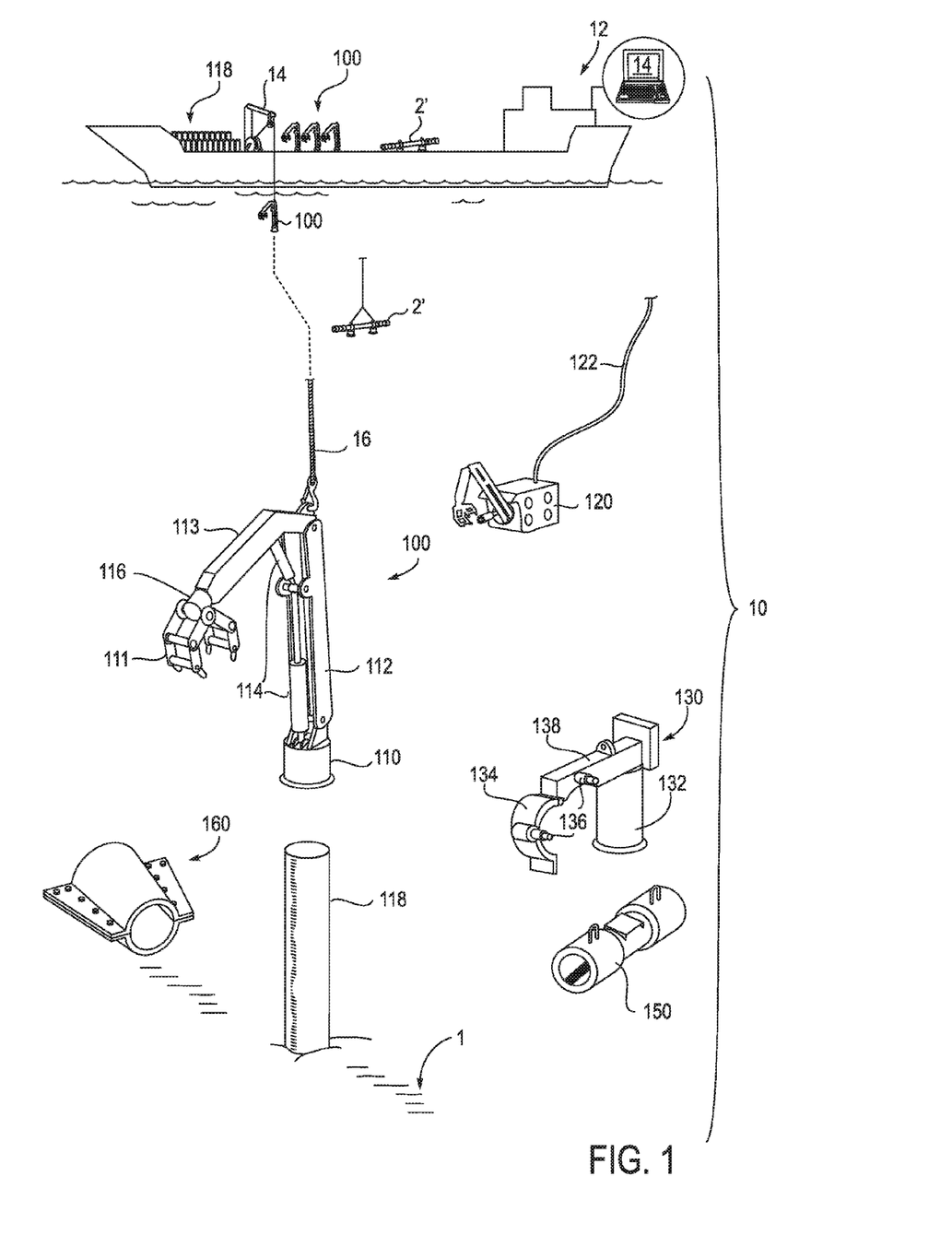
FIG. 1 illustrates the equipment components to be used in a pipe repair system according to an embodiment of the present invention.

In the embodiments disclosed herein, a system is provided which utilizes certain equipment components to replace, reposition and/or repair a section of subsea pipe. FIG. 1 illustrates the equipment components utilized by the system.

Surface vessel 12 delivers the system components to the vicinity of the needed pipeline repair at the surface of the ocean. The vessel 12 is equipped with a crane/winch 14 for lifting and lowering equipment via deployment rigging 16. The steps of the methods of the embodiments disclosed herein are carried out in conjunction with the surface vessel as described hereinafter.

Standard remotely operated vehicles (ROV's) 120 including known ROV tooling suites, hydraulic controls and interfaces and pipe preparation tooling can be used with the system components in order to carry out the methods disclosed herein. Throughout this description, system components that are said to be hydraulically controlled can be controlled by standard ROV hydraulic tooling. ROV's are connected to the surface or a control module via tether 122.

Piles 118 are used to anchor load-bearing equipment into the seabed 1. The piles can be suction-type piles. The methods used for driving piles by suction are well known in the art and will not be described in detail. Examples of such piles and their operation are described in U.S. Pat. Nos. 4,575,282 and 6,719,496. The number of piles utilized depends on the objective and magnitude of a given embodiment. For instance, merely repositioning a section of pipe or repairing a pinhole leak in a pipe requires at least two piles, while replacing a section of pipe requires at least six piles. Each of these scenarios will be described further herein.

Manipulator assemblies 100 are used to grasp, lift and hold a section of pipe during the replacing, repositioning and/or repairing methods. The number of manipulator assemblies utilized depends on the objective of a given embodiment. At least two manipulator assemblies are utilized for repositioning or repairing a pinhole leak, while at least four manipulator assemblies are utilized for replacing a section of pipe. In one embodiment, each manipulator assembly 100 has an azimuthing base 110 and a manipulator arm controllable by hydraulics 114, the manipulator arm including a proximal arm 112 pivotally connected to the base 110 and a distal arm 113 pivotally connected to the proximal arm 112. At the end of the distal arm 113 is a swivel joint 116 and a grapple 111 capable of securely grasping a pipe located on the seabed, and lifting, maneuvering and holding the pipe. The base 110 has up to 360° nominal rotation adapted to receive the top end of a pile. The base is preferably keyed in order to lock the manipulator assembly in place. The base encapsulates the top end of a pile, also referred to herein as a "pile top," and allows the grapple loads to react against the partially driven pile. The manipulator assembly could alternatively be fixed to the pile top by the use of other suitable means, including the use of bolts and the like. The proximal and distal arms of the manipulator arm can extend the grapple up to the full length of the manipulator arm, for instance up to about 20 feet (6 m), even up to about 14 feet (4 m) from the base 110. Each manipulator arm has a hydraulic tool receptacle (not shown) for receiving hydraulic control, for instance from a remotely operated vehicle via a tool for establishing a hydraulic connection commonly referred to as a "hot stab."

A pair of spool supports 130 is used to support a replacement spool 2' during the replacement method. Each spool support 130 has a base 132 similar to the base 110 of the manipulator assemblies, a brace or restraint formed by the cooperation of 138 and 134 capable of securely holding the pipe circumferentially, and a hydraulically controlled pushoff mechanism 136 consisting of two pistons capable of pushing connectors axially along the length of the replacement spool.

A pair of connectors 150 is used to connect the replacement spool 2' to the surrounding cut ends of the existing pipe between which the replacement spool is to be inserted. Each connector 150 is configured to fit slideably over the gap between a section of pipe and a replacement spool and consists of means for gripping and sealing both the pipe and replacement spool. Such connectors are known for connecting subsea pipe. A description of an exemplary connector and its operation can be found in U.S. Pat. No. 4,076,130. Once a connector is positioned in the desired location to bridge the gap between existing pipe and the replacement spool, the connector is set to lock the connector in place. The connector is set using hydraulic pressure from the ROV hot stab.

A holdback yoke 160 capable of being securely and permanently attached to a pipe at a particular location can be attached to at least one permanent partially driven pile by holdback lines 162 in order to stabilize pipe movement on sloping seabed surfaces after the replacement or repair operation is completed.

In one embodiment, a method is provided for replacing a section of subsea pipe located on a seabed. This section of pipe to be replaced is an integral part of a greater subsea pipeline, also referred to interchangeably as pipe. According to this embodiment, a section of pipe to be replaced is first identified. With the assistance of an ROV, marker buoys can be placed to identify the location of the cuts to be made in the pipe.

The ROV will move along the length of the pipe by a distance from the damaged section of pipe (also referred to as the section to be replaced) and then test the pipe for straightness and ovality. In one embodiment, the ROV moves up to about 40 feet (12 m) from the damaged section. If the straightness and ovality are not acceptable, the ROV will continue moving along the length of the pipe until the pipe dimensions fall within predetermined specifications. In one embodiment, this distance is up to about 90 feet (27 m) from the damaged section of pipe. When the pipe dimensions are found to be acceptable, the ROV will mark locations for the insertion of spool support piles into the seabed.

The ROV will then continue along the pipe axis, a further distance, such as for instance up to about 25 feet (7.6 m), on either side of the section to be replaced, and mark locations for a first set of manipulator assembly support piles. These markers are preferably on the opposite side of the pipe from the spool support piles. In one embodiment, the markers are placed approximately 12 feet (3.6 m) from the pipe centerline. The ROV will continue along the pipe axis an additional distance, such as for instance up to about 100 feet (30 m) from both of the spool markers, and mark locations for a second set of manipulator assembly support piles. In one embodiment, the markers are placed approximately 12 feet (3.6 m) from the pipe centerline.

Figure 2:
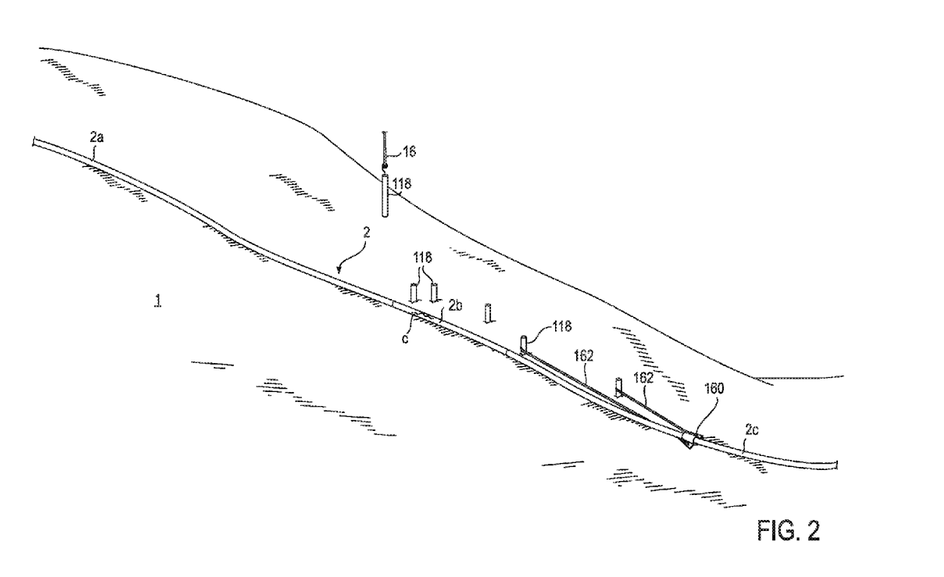
FIG. 2 illustrates the installation of piles into a seabed adjacent a pipeline to be repaired for use in a method for the replacement of a section of pipe according to an embodiment of the present invention.

Referring to FIG. 2, at least four of the piles 118 are intended for supporting manipulator assemblies, also referred to herein as "manipulator support piles." The piles are lowered from the surface using rigging 16. The manipulator support piles are partially driven into the seabed 1 adjacent the pipeline 2, with at least two piles upstream and at least two piles downstream of the section of pipe to be replaced 2b having crack c. The two manipulator support piles upstream of the section of pipe to be replaced are adjacent the pipeline portion 2a which is upstream of the damaged section of pipe, also referred to as the uphill section of pipe. The two manipulator support piles downstream of the section of pipe to be replaced are adjacent the pipeline portion 2c which is downstream of the damaged section of pipe, also referred to as the downhill section of pipe. By "adjacent" is meant within 10 feet (3 m) of the axis of the pipe. By "partially driven" is meant inserted substantially vertically into the seabed by any known means such that one end of the pile is exposed above the seabed. The exposed pile end is also referred to as a "pile top."

At least two of the piles 118 are intended for supporting spool supports, also referred to herein as "spool support piles." The spool support piles are partially driven into the seabed adjacent the section of pipe to be replaced 2b between the ends of the damaged section of pipe.

In a preferred embodiment, a holdback yoke 160 is installed onto the downhill portion 2c of the pipeline for purposes of holding the repaired pipeline in place after the repair operations are completed by attaching the yoke to two pile tops which will be left in place permanently. In such an embodiment, once the six piles are initially placed at the start of operations, the yoke is installed so that it is securely attached about a section of the pipe downhill of the damaged section of pipe. Two securing means 162 such as wires, chains or the like, referred to as holdback lines, are attached to each of two piles intended to be left in place and to the holdback yoke. The holdback lines can be installed and tightened by the ROV tooling.

Figure 3:
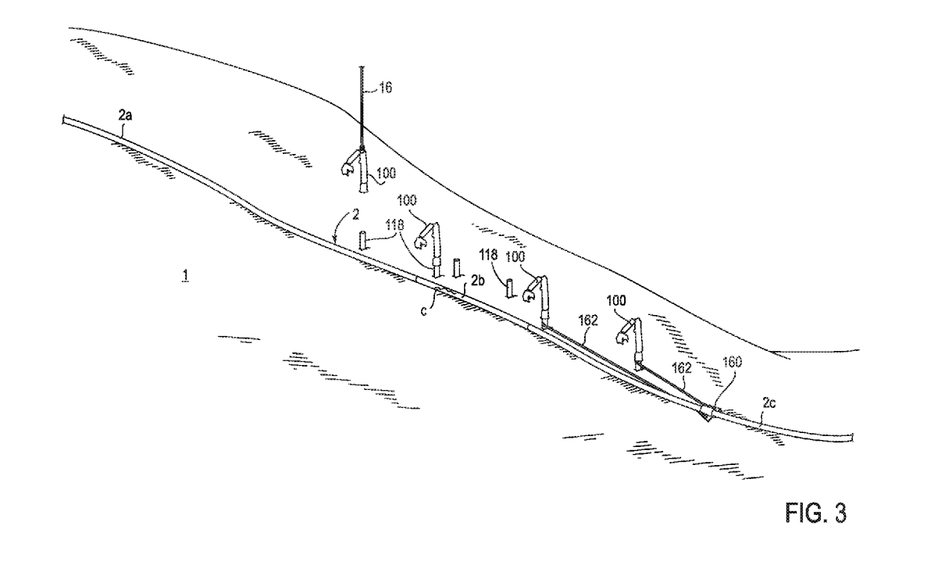
FIG. 3 illustrates the installation of manipulator assemblies on pile tops for use in a method for the replacement of a section of pipe according to an embodiment of the present invention.

Referring to FIG. 3, once the pipeline is secured as described above, the manipulator assemblies 100 are lowered into place on the manipulator support piles 118 beginning with the most downhill manipulator support pile. Once the base of each manipulator assembly has encapsulated the pile, the ROV will then rotate the base into alignment for the orientation key to allow seating of the manipulator assembly onto the pile. This process is repeated for the remaining three manipulator assemblies. Each manipulator assembly can be lowered using rigging cable 16 attached to a hook or loop on the manipulator assembly, which is raised and lowered by the crane/winch 14 aboard surface vessel 12.

Once the manipulator assemblies are installed on the manipulator support piles, the hydraulic controls of the manipulator arms can be engaged by the ROV to securely grasp the pipe at two locations upstream and two locations downstream of the section of pipe to be replaced. At this point, the manipulator arms can be controlled to lift the pipe off the seabed into a desired position so that two cuts can be made through the pipe in the desired locations at the ends of the damaged section. Any suitable known technology for cutting subsea pipe and preparing the cut pipe ends can be used. After the cuts are made, the damaged section of pipe to be replaced can be set aside on the seabed and/or removed to the surface vessel. Once the section of pipe to be replaced is removed, the distance between the upstream cut end of pipe (i.e., cut end of uphill section of pipe 2a) and the downstream cut end of pipe (i.e., cut end of downhill section of pipe 2c) can be measured. Spool length metrology is done coarsely using the spool support piles where accuracies in measurement of the support piles centers can accommodate errors of +/−24 inches (61 cm) over 160 foot (49 m) spool lengths. This method removes the necessity for accurate spool length metrology. The measured distance is used to size the replacement spool to the appropriate length. The replacement spool can be fabricated on the surface vessel 12 using any suitable known techniques. The replacement spool is then fitted with two spool supports 130 adjacent each other on the spool and two connectors 150 on either side of the spool supports.

Figure 4:
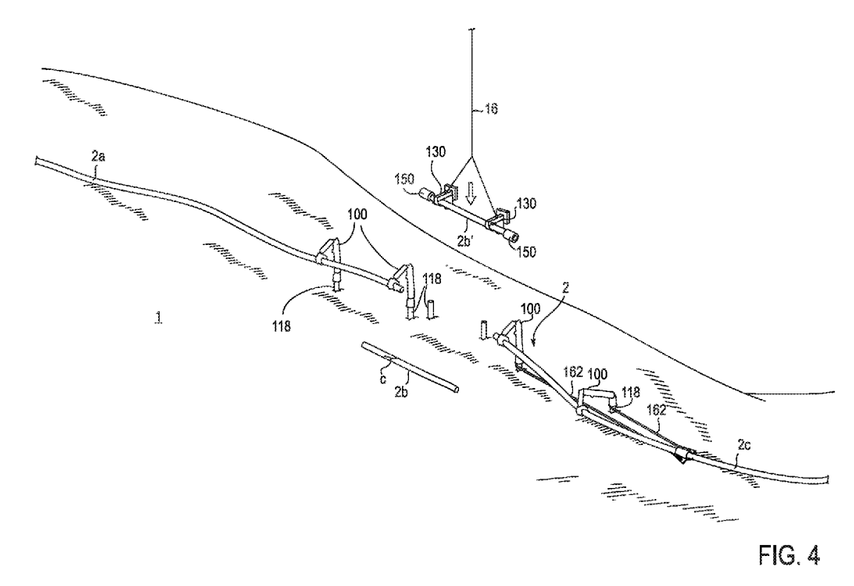
FIG. 4 illustrates the lowering into place of a replacement spool of pipe to replace a damaged section of pipe as part of a method for the replacement of a section of pipe according to an embodiment of the present invention.

Referring to FIG. 4, once the damaged section 2b has been removed and the pipe ends prepared (e.g., using an "end prep tool" to remove burrs), the ROV will operate the manipulator assemblies 100 to manipulate the cut pipe ends into realignment. The replacement spool 2b' is then lowered with the rigging 16 so that the spool supports 130 land onto the spool support piles 118. The ends of the replacement spool 2b' are then brought into alignment with the cut ends by controlling the manipulator assemblies holding the pipe on either side of the replacement spool.

Figure 5:
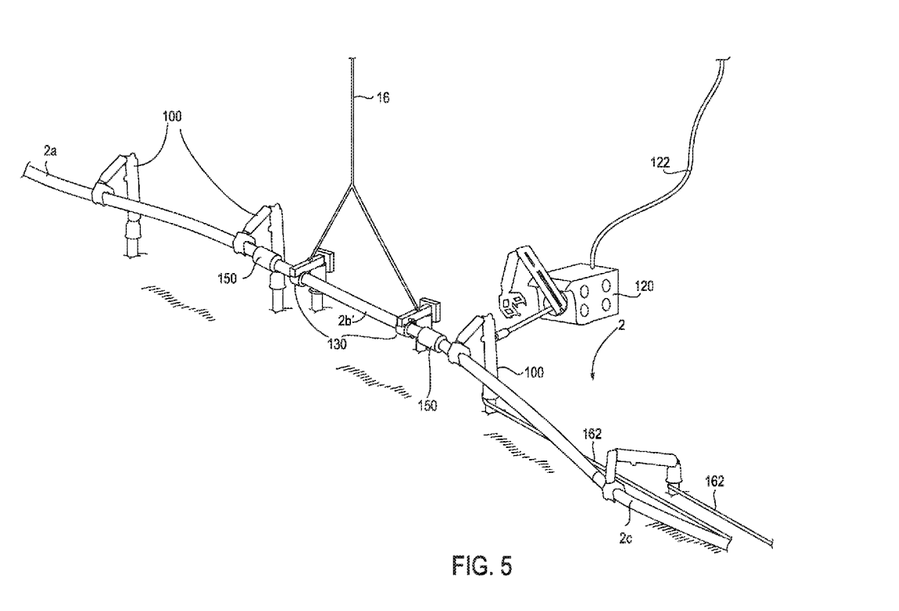
FIG. 5 illustrates a stage in a method for the replacement of a section of pipe according to an embodiment of the present invention after the replacement spool has been connected to the existing pipeline.

Once properly positioned, the replacement spool is connected to the existing pipe using the connectors 150 at each end of the replacement spool. The pushoff mechanism on each spool support 130 is activated by the ROV such that the pistons stroke the connector 150 onto the ends of pipe sections 2a and 2c. The action of the pistons pushes the connectors from the replacement spool onto the pipe ends so that the connectors bridge the gaps between the replacement spool and the pipe both upstream and downstream of the replacement spool. The connectors are then set by the ROV using hydraulic pressure and finally pressure tested by the ROV. At this point, as illustrated in FIG. 5, the replacement spool 2b' has been connected with the pipeline and is still supported by the spool supports 130 on spool support piles 118.

Once the connectors 150 have been set, the manipulator assemblies 100 will take the load from the spool supports 130. The ROV will then release the spool 2b' from the spool supports 130 which can then be removed. The manipulator arms are then engaged to lower the pipe complete with the new replacement spool to the seabed.

Figure 6:
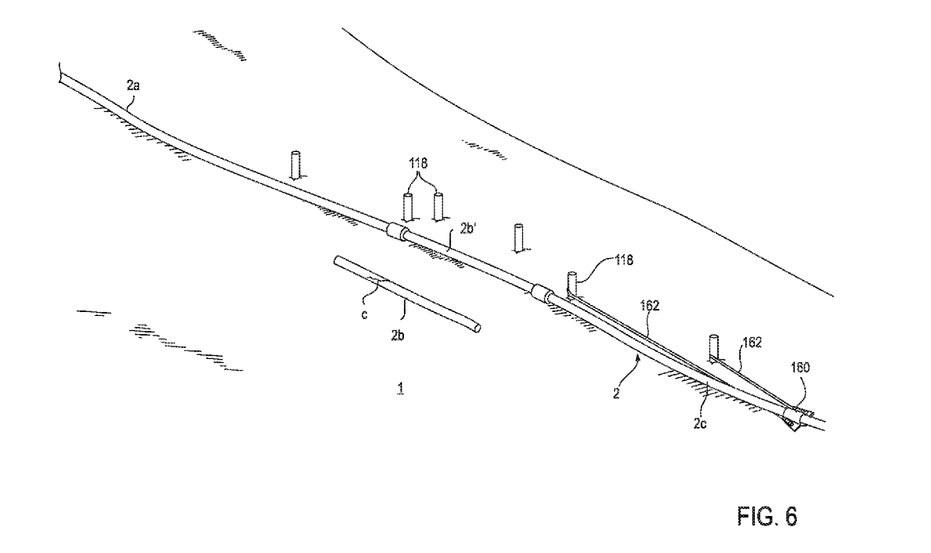
FIG. 6 illustrates a pipeline after a section of pipe has been replaced according to an embodiment of the present invention.

The surface vessel will then lower the rigging 16, and the ROV will commence operations to attach the rigging to the manipulator assemblies and spool supports and recover the equipment to the surface vessel 12. Once all manipulator assemblies and spool supports have been recovered, as illustrated in FIG. 6, the ROV will commence operations to recover the piles. It may be preferred to remove the piles from the seabed once the pipe replacement is completed. In some embodiments, e.g., on a slope greater than 2.5°, it is preferred to leave at least one pile in place to serve to prevent the down slope movement of the pipe. In one embodiment, two piles can be left in place in the seabed for the purpose of supporting pipeline loads via a holdback yoke 160 attached to the piles via lines 162.

Once recovered to the surface vessel, the piles and manipulator assemblies can be reused repeatedly.

The above described sequence of operations is suitable for a standard straight replacement spool installation, assuming a replacement spool piece up to about 200 feet (61 m) in length and a pipe outer diameter of up to about 24 inches (61 cm). Greater lengths will require additional piles and additional manipulator assemblies as will be readily appreciated by the skilled artisan. When a long section of pipe is to be replaced, two replacement spools can be used to connect the long section with the existing pipe as will be readily appreciated by the skilled artisan.

The manipulator assembly functions are hydraulically driven by the ROV hydraulic system; however, various hydraulic controls and alignment sensor systems can be installed from partial automation to complete automation of the system in the pipe lift and alignment process. The methods and systems disclosed herein can be generally configured in three different modes of control.

In a control arrangement according to one embodiment, the pipe replacement, repositioning and/or repair system is configured with no autonomous controls in which case all equipment is independently operated and all functions are activated locally at the equipment (e.g., manipulator arm, spool support, connector) by the ROV via the ROV hydraulic supply. FIG. 5 illustrates this mode of control.

Figure 7A:
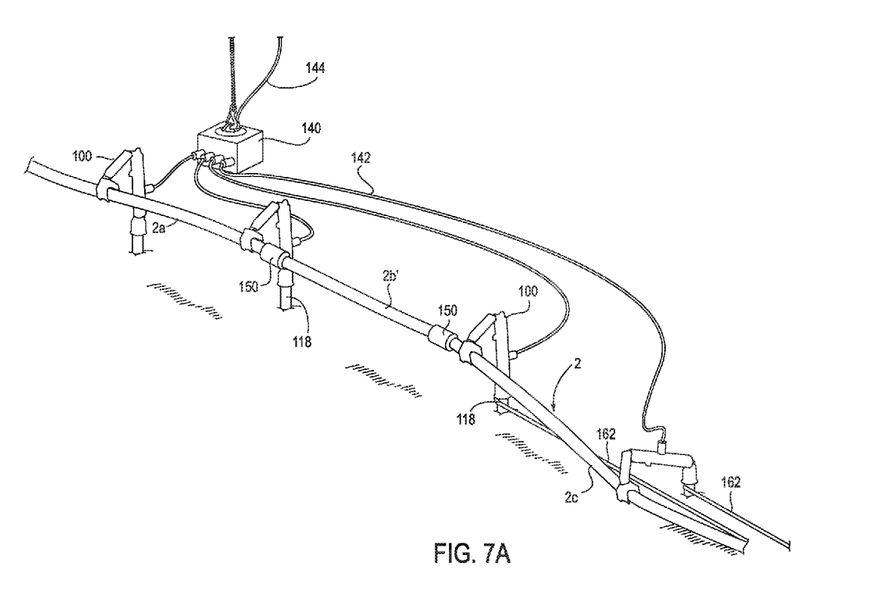
FIGS. 7A-7B illustrate control schemes for controlling manipulator assemblies in a method for the replacement of a section of pipe, according to alternative embodiments of the present invention.

In a control arrangement according to another embodiment, as illustrated in FIG. 7A, the system is configured such that the manipulator assemblies 100 are controlled by means of lines 142 connected to an umbilical termination adapter 140 connected to umbilical 144 containing power and telemetry lines. In this embodiment, each manipulator arm is controlled by the umbilical termination adapter rather than by an ROV.

Figure 7B:
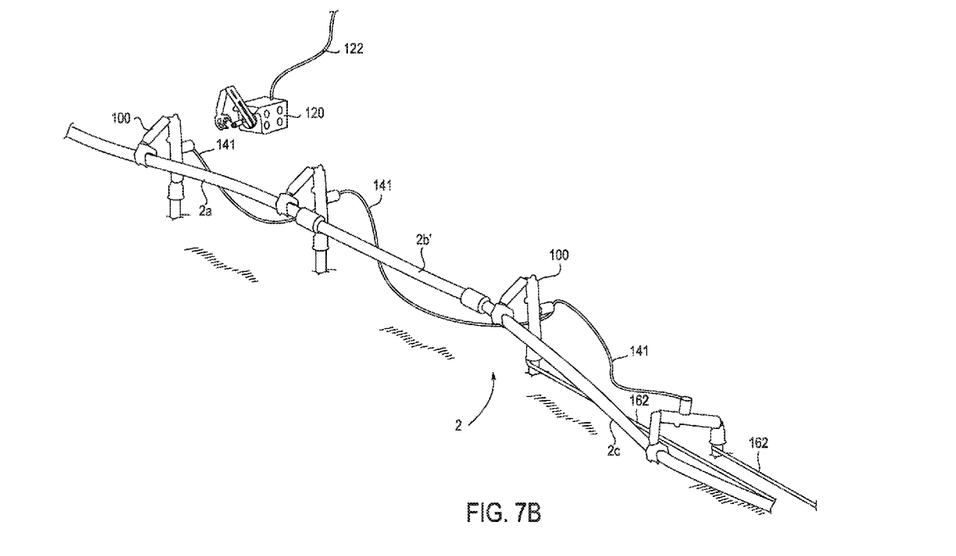

In a control arrangement according to another embodiment, as illustrated in FIG. 7B, the system is configured with semi-automatic control wherein the manipulator assemblies 100 are equipped with integrated sensors and hydraulic circuits which are linked together via jumper lines or cables 141 so that each manipulator arm can be controlled remotely or indirectly by the ROV 120.

In a control arrangement according to yet another embodiment, the system is configured with automatic control as described in the semi-automatic control mode, further including power and telemetry connections to a computer (depicted as 14 in FIG. 1) on the surface vessel 12. In this embodiment, the grasping, moving and releasing steps performed by the hydraulically controlled manipulator arm are controlled by a preprogrammed sequence prescribed or directed by a computer program in a computer readable media. An operator on the surface vessel initiates the pipe replacement sequencing, repositioning, alignment and stroking operation by initiating the computer program. Power and telemetry umbilical 144 connects a power source and the computer, respectively, to a submerged interface apparatus, also referred to as an umbilical termination adapter 140. A power line connects the submerged interface apparatus and each manipulator assembly 100 for providing power to drive the hydraulically controlled manipulator arm. A telemetry line connects the submerged interface apparatus and each manipulator assembly for providing hydraulic control of the manipulator arm.

As would be readily apparent to one skilled in the art, the system can optionally be equipped with mechanical lock systems in order to maintain precision load holding while holding equipment in place over prolonged periods of time.

In addition to replacing, repositioning and/or repairing a section of subsea pipe, the systems and methods disclosed herein can also be used to replace, reposition and/or repair other pieces of subsea equipment having dimensions susceptible to manipulation by the presently disclosed systems.

The drawings illustrate particular embodiments of the present invention. It will be appreciated that the apparatus may vary as to configuration and as to details of the parts, and that the methods may vary as to specific steps and sequences, without departing from the basic concepts as disclosed herein.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims.

What is claimed is:

1. A method for repairing, repositioning and/or replacing a section of pipe or equipment located on a seabed, comprising:
   a. partially driving at least two piles into the seabed adjacent a section of pipe or equipment to be repaired, repositioned and/or replaced such that each of the piles has an exposed pile top above the seabed;
   b. installing on each of the pile tops a manipulator assembly having an azimuthing base for encapsulating the pile top and a hydraulically controlled manipulator arm, the manipulator arm including;
      i. a proximal arm pivotally connected to the azimuthing base,
      ii. a first hydraulic cylinder attached to the azimuthing base and the proximal arm for controlling movement of the proximal arm relative to the azimuthing base,
      iii. a distal arm pivotally connected to the proximal arm,
      iv. a second hydraulic cylinder attached to the proximal arm and the distal arm for controlling movement of the distal arm relative to the proximal arm,
      v. a swivel joint connected to the distal arm, and
      vi. a grapple connected to the swivel joint capable of grasping and repositioning the section of pipe or equipment; and
   c. operating the manipulator assemblies to grasp the section of pipe or equipment and lift the section of pipe or equipment off the seabed.

2. A method for replacing a section of pipe within a pipeline located on a seabed with a replacement spool, comprising:
   a. grasping a pipe at locations upstream and downstream of a section of the pipe to be replaced and lifting the pipe off the seabed using a plurality of manipulator assemblies each manipulator assembly having an azimuthing base for encapsulating receiving the a pile top and a hydraulically controlled manipulator arm, the manipulator arm including;
      i. a proximal arm pivotally connected to the azimuthing base,
      ii. a first hydraulic cylinder attached to the azimuthing base and the proximal arm for controlling movement of the proximal arm relative to the azimuthing base,
      iii. a distal arm pivotally connected to the proximal arm,
      iv. a second hydraulic cylinder attached to the proximal arm and the distal arm for controlling movement of the distal arm relative to the proximal arm,
      v. a swivel joint connected to the distal arm, and
      vi. a grapple connected to the swivel joint capable of grasping and repositioning a section of pipe;
      wherein each manipulator assembly is installed on a pile top adjacent the pipe;
   b. providing two opposing cut ends of pipe and a gap in the pipeline;
   c. providing a replacement spool having two ends and having two spool supports and two connectors for bridging abutting sections of pipe installed thereon between the two ends, wherein each spool support has a base for encapsulating a spool support pile top, a restraint mounted to the base capable of securely holding the replacement spool and a hydraulically controlled pushoff mechanism integral to the restraint wherein each connector is positioned between a spool support and one end of the replacement spool;
   d. aligning the replacement spool with the cut ends in the gap;
   e. providing two spool support pile tops in the seabed;
   f. lowering the replacement spool so that the spool supports fit onto the spool support pile tops; and
   g. actuating each pushoff mechanism to push each connector to bridge each end of the replacement spool and each cut end of pipe.

3. The method of claim 2, further comprising:
   h. setting the connectors in place;
   i. removing the spool supports from the replacement spool; and
   j. operating the manipulator assemblies to lower the pipe to the seabed.

4. The method of claim 2, further comprising:
   h. removing the manipulator assemblies and the spool supports from the pile tops; and
   i. removing each pile from the seabed.

5. The method of claim 2 wherein the manipulator assemblies are connected by jumper lines such that the hydraulically controlled manipulator arms are remotely controlled by a remotely operated vehicle.

6. The method of claim 2 wherein the hydraulically controlled manipulator arms are controlled by a preprogrammed sequence in a computer readable media in a computer connected to the manipulator assemblies as initiated by an operator on a surface vessel.

7. The method of claim 2 wherein the pipe is located on a seabed having a seabed slope of between 10° and 30° with respect to the horizontal.

8. A method for replacing a section of pipe located on a seabed with a replacement spool, comprising:
   a. partially driving two spool support piles into the seabed along the length of a pipe located on a seabed and adjacent a section of pipe to be replaced such that each of the piles has an exposed spool support pile top above the seabed;
   b. partially driving at least two manipulator support piles into the seabed adjacent a section of pipe upstream of the section of pipe to be replaced and at least two manipulator support piles into the seabed adjacent a section of pipe downstream of the section of pipe to be replaced such that each of the piles has an exposed manipulator support pile top above the seabed;
   c. installing on each of the manipulator support pile tops a manipulator assembly having an azimuthing base for encapsulating the pile top and a hydraulically controlled manipulator arm, the manipulator arm including;
      i. a proximal arm pivotally connected to the azimuthing base,
      ii. a first hydraulic cylinder attached to the azimuthing base and the proximal arm for controlling movement of the proximal arm relative to the azimuthing base,
      iii. a distal arm pivotally connected to the proximal arm,
      iv. a second hydraulic cylinder attached to the proximal arm and the distal arm for controlling movement of the distal arm relative to the proximal arm,
      v. a swivel joint connected to the distal arm, and
      vi. a grapple connected to the swivel joint capable of grasping and repositioning the section of pipe;
   d. operating the manipulator assemblies to grasp the pipe at locations upstream and downstream of the section of pipe to be replaced and lift the pipe off the seabed;

e. cutting the pipe in two locations thereby freeing the section of pipe to be replaced from the pipe and forming two opposing cut ends of pipe and a gap in the pipe;

f. removing the section of pipe to be replaced from the pipe;

g. on a surface vessel, fabricating a replacement spool for installation within the gap;

h. installing on the replacement spool two spool supports each having a base for encapsulating a spool support pile top, a restraint mounted to the base capable of securely holding the replacement spool and a hydraulically controlled pushoff mechanism integral to the restraint comprising two pistons capable of pushing in a direction parallel to the longitudinal axis of the replacement spool;

i. installing on the replacement spool two connectors for bridging abutting sections of pipe;

j. aligning the replacement spool with the cut ends in the gap;

k. lowering the replacement spool so that the spool supports fit onto the spool support pile tops;

l. actuating each pushoff mechanism to push each connector to bridge each end of the replacement spool and each cut end of pipe;

m. setting the connectors in place;

n. removing the spool supports from the replacement spool; and o. operating the manipulator assemblies to lower the pipe to the seabed.

9. A manipulator apparatus for grasping and repositioning a section of pipe comprising:

a. a pile capable of being partially driven into a seabed; and b. a manipulator assembly having an azimuthing base for encapsulating the pile top wherein the base is keyed to lock the manipulator assembly in place and a hydraulically controlled manipulator arm, the manipulator arm including:

i. a proximal arm pivotally connected to the azimuthing base, ii. a first hydraulic cylinder attached to the azimuthing base and the proximal arm for controlling movement of the proximal arm relative to the azimuthing base, iii. a distal arm pivotally connected to the proximal arm, iv. a second hydraulic cylinder attached to the proximal arm and the distal arm for controlling movement of the distal arm relative to the proximal arm, v. a swivel joint connected to the distal arm, and vi. a grapple connected to the swivel joint capable of grasping and repositioning the section of pipe.

10. A system for replacing a section of pipe located on a seabed with a replacement spool, comprising:

a. at least six piles capable of being partially driven into a seabed adjacent a section of pipe thereby providing a plurality of exposed pile tops above the seabed;

b. at least four manipulator assemblies, each manipulator assembly having an azimuthing base for encapsulating the pile top and a hydraulically controlled manipulator arm, the manipulator arm including:

i. a proximal arm pivotally connected to the azimuthing base, ii. a first hydraulic cylinder attached to the azimuthing base and the proximal arm for controlling movement of the proximal arm relative to the azimuthing base, iii. a distal arm pivotally connected to the proximal arm, iv. a second hydraulic cylinder attached to the proximal arm and the distal arm for controlling movement of the distal arm relative to the proximal arm, v. a swivel joint connected to the distal arm, and vi. a grapple connected to the swivel joint capable of grasping and repositioning the section of pipe;

c. at least two spool supports, each spool support having base for encapsulating a spool support pile top, a restraint mounted to the base capable of securely holding the replacement spool and a hydraulically controlled pushoff mechanism integral to the restraint comprising two pistons capable of pushing in a direction parallel to the longitudinal axis of the replacement spool; and d. at least two connectors for bridging two abutting sections of pipe, each connector capable of slideably fitting around the replacement spool.

11. The system of claim 10, further comprising a pipe cutter for cutting the pipe.

12. The system of claim 10, wherein the manipulator arms are connected by jumper lines.

13. The method of claim 1, wherein the seabed has a seabed slope of between 10° and 30° with respect to the horizontal, and wherein the section of pipe is made from steel and has a diameter between about 5 cm and about 127 cm.

14. The manipulator apparatus of claim 9, wherein the manipulator apparatus is capable of grasping and repositioning the section of pipe on the seabed at the pile partially driven into the seabed.

* * * * *